United States Patent [19]
Nolle

[11] Patent Number: 5,349,742
[45] Date of Patent: Sep. 27, 1994

[54] METHOD OF MAKING A SECONDARY FOR USE IN INDUCTION MOTORS

[75] Inventor: Eugen Nolle, Sersheim, Fed. Rep. of Germany

[73] Assignee: Blum GmbH, Vaihingen, Fed. Rep. of Germany

[21] Appl. No.: 937,354

[22] Filed: Aug. 27, 1992

[30] Foreign Application Priority Data

Aug. 29, 1991 [DE] Fed. Rep. of Germany ....... 4128757
Oct. 23, 1991 [DE] Fed. Rep. of Germany ....... 4134884

[51] Int. Cl.$^5$ .......................................... H02K 15/06
[52] U.S. Cl. ........................................ 29/598; 29/606; 310/182; 310/211
[58] Field of Search ............... 29/598, 606; 310/212, 310/211, 182, 154–156

[56] References Cited

U.S. PATENT DOCUMENTS 3,371,410 3/1968 Gintovt ................................ 29/598

Primary Examiner—Carl E. Hall
Attorney, Agent, or Firm—Darby & Darby

[57] ABSTRACT

The core of the secondary for use in a linear or other induction motor is a ladder-like stamping with two spaced apart rails and a number of bars extending between and having end portions of one piece with the rails. The bars of the cage can be inserted into the recesses of a core, and such recesses can be provided in one side or in two opposite sides of the core. Each recess can receive a single bar or the bars of two or more discrete cores. The bars can be confined in their recesses by slidable closures or by plugs of a hardened adhesive, a synthetic resin or an impregnating agent.

35 Claims, 9 Drawing Sheets

Fig.1

PRIOR ART

METHOD OF MAKING A SECONDARY FOR USE IN INDUCTION MOTORS

BACKGROUND OF THE INVENTION

The invention relates to induction motors and analogous machines, and more particularly to improvements in secondaries (including cages and cores) for use in such machines. The invention also relates to improvements in methods of making the secondaries as well as to improvements in cages and in cores of secondaries and in methods of making the cores and cages.

A drawback of presently known secondaries for use in induction motors and analogous machines is that they must be assembled of a large number of separately produced parts as well as that the cost of assembling the parts into the cores and cages of secondaries, and of assembling the cores and cages into secondaries, is very high.

OBJECTS OF THE INVENTION

An object of the invention is to provide a novel and improved method of making cages for use in the secondaries of induction motors or analogous machines.

Another object of the invention is to provide a novel and improved method of making cores for use in the improved cages.

A further object of the invention is to provide a method of assembling the above outlined cores with the above outlined cages into secondaries of induction motors and the like.

An additional object of the invention is to provide linear and other induction motors which embody the improved cores and cages.

Still another object of the invention is to provide a novel and improved cage for use in linear or other types of induction motors.

A further object of the invention is to provide a novel and improved core for use in the secondaries of linear or other induction motors.

Another object of the invention is to provide a novel and improved secondary for use in an induction motor.

An additional object of the invention is to provide a simple and inexpensive method of making cores for use in the secondaries of induction motors and like machines.

Still another object of the invention is to provide a simple and inexpensive method of making cages for use in linear and other induction motors.

A further object of the invention is to provide a simple and inexpensive method of assembling the above outlined cages with the above outlined cores into the secondaries of linear or other induction motors.

Another object of the invention is to provide novel and improved supports for the secondaries in linear or other types of induction motors.

An additional object of the invention is to provide a novel and improved linear induction motor.

Still another object of the invention is to provide a novel and improved rotary secondary for an induction motor.

SUMMARY OF THE INVENTION

One feature of the instant invention resides in the provision of a method of making a secondary for use in linear or rotary induction motors or the like. The method comprises the steps of providing a core with at least one set of recesses, forming at least one substantially ladder-shaped cage with two spaced apart rails and bars extending between and of one piece with the rails, and inserting the bars into the recesses of the core.

The forming step can comprise stamping the at least one cage from a blank.

The forming step can comprise forming (e.g., stamping) a plurality of cages, and the inserting step then comprises stacking each bar of one cage upon a bar of each other cage in a recess of the core. If the forming step such method includes stamping the cores, each core can be formed by removing material from a discrete blank; alternatively, one and the same blank or two or more identical blanks can be used to form two or more cores.

The blank which is used to stamp one or more cages can constitute or resemble a sheet or panel which is made of copper or aluminum.

The step of providing the core with recesses can include providing the core with recesses in the form of grooves each having an open side, and the inserting step can include introducing the bars into the grooves so that the bars are at least slightly spaced apart from the open sides of the grooves. Such method further comprises the step of anchoring or confining the bars in the respective grooves, and the anchoring or confining procedure can involve admitting a hardenable substance into the grooves at the open sides of the respective grooves. The providing step of such method can further comprise providing each groove with at least one lateral extension at the open side of the respective groove. The anchoring or confining step of such method can include admitting the hardenable substance in such quantities that the admitted hardenable substance at least partially fills the extensions. This ensures reliable anchoring of the closures which are constituted by the hardened substance. The hardenable substance can consist of or can contain an adhesive, a synthetic resin or an impregnating agent with magnetizable ingredients in the impregnating agent.

Instead of resorting to a hardenable substance, the confining or anchoring step can include overlapping the properly introduced bars by closures (e.g., slidable strips) having portions extending into the respective extensions. Each recess or groove of the core which is used in connection with the practice of such method is preferably provided with two lateral extensions which confront each other at the open side of the respective recess or groove. Each closure can comprise two elongated marginal portions which can be introduced into the extensions of the respective groove or recess to confine the inserted bar or bars in the groove in such a way that the closure is disposed between the introduced bar or bars and the open side of the respective groove or recess.

The providing step can comprise assembling a stack of superimposed laminations having cutouts which together constitute the recesses of the thus obtained core.

The forming step can include forming the at least one cage with windows which alternate with the bars. The providing step of such method can comprise making the core of at least one lamination having sections which extend into the windows upon completion of the inserting step. Such providing step can include making the core from a plurality of superimposed (overlapping) laminations having aligned sections which extend into the windows upon completion of the inserting step. Portions of sections of at least one lamination can project from the respective windows, and such method can further comprise the step of bending the projecting portions of the sections of at least one lamination to confine each section in the respective window. The at least one lamination abuts a bar of the at least one cage.

The making step can comprise providing a discrete substantially strip-shaped lamination for each window of the cage and folding each lamination into a package of neighboring layers having ends which extend from the respective window upon completion of the inserting step. Each window is disposed between two neighboring bars, and such method can further comprise the step of bending each end of each inserted package against one of the neighboring bars.

The providing step can comprise making a cylindrical core having a peripheral surface with at least one set of recesses in the peripheral surface. The inserting step of such method can comprise introducing each bar into a discrete recess and deforming the rails between the bars. Such inserting step can further comprise flexing the rails at the peripheral surface into ring-shaped bodies. The ends of such ring-shaped bodies can be welded, glued, soldered, riveted, bolted or otherwise affixed to the core and/or to another part of the respective rail. For example, one end of each ring-shaped body can be affixed to the other end of the respective body.

Another feature of the present invention resides in the provision of a secondary for use in a linear or rotary induction motor or the like. The secondary comprises a core having at least one set of recesses, and at least one cage including two spaced apart rails and a plurality of bars spaced apart from each other, extending transversely of and between the rails and being of one piece of the rails. Each bar is received in a recess of the core.

The at least one cage can constitute a stamping.

The bars can be normal to or they can make oblique angles with the rails.

The core can have a single set of recesses. Alternatively, a first side of the core can be provided with the at least one set of recesses and a second side of the core opposite the first side can be provided with a second set of recesses. This renders it possible to employ a second cage with bars which extend into the recesses of the second set. Each recess of the at least one set can be aligned with a recess of the second set. Alternatively, at least some recesses of the at least one set can be staggered relative to the recesses of the second set.

The at least one cage can consist of the aforementioned rails and bars. Alternatively, the secondary can comprise two cages for a single set of recesses, i.e., three or more cages if the core is provided with two sets of recesses. For example, two identical or different cages can be stacked or placed on top of each other so that each bar of one cage overlies a bar of the other cage. Each recess of the at least one set of recesses then receives two overlapping (stacked) bars. It is also possible to assemble more than two cages so that each recess of the at least one set then receives more than two aligned bars.

The at least one cage can comprise a first portion which consists of a first material and a second portion consisting of a different second material. If the recesses of the at least one set each receive two or more aligned bars forming part of two or more aligned overlapping cages, each such cage can be made of a different material or at least two cages can be made of identical material. The at least one cage (e.g., a single cage or a composite cage consisting of two or more superimposed individual cages) can have a first thickness, and at least one other individual cage can have a different second thickness.

The recesses have open sides, and each such recess can be provided with at least one lateral extension at the open side. The extensions are disposed between the properly inserted discrete bars or groups of aligned overlapping bars in the respective recesses and the respective open sides. Such secondary preferably further comprises means for confining the bars in the respective recesses. The confining means preferably comprises portions which are received in the extensions of the recesses. Each recess can be provided with a pair of confronting extensions, and the confining means can comprise closures with marginal portions extending into the pairs of confronting extensions of the respective recesses. Each closure (e.g., a slidable strip or plate) can consist of a non-magnetizable material, of a partially magnetizable material or of a magnetizable material.

Alternatively, the confining means can comprise a hardened material, e.g., a hardened adhesive, a hardened synthetic resin or a hardened impregnating agent in admixture to a magnetizable material. Such hardened closure extends into the extension or extensions of each recess and at least partially fills the recess between the inserted bar or bars and the open side.

The at least one cage has windows which alternate with the bars and are disposed between the rails. The core can comprise at least one conductive metallic lamination in each window or a lamination having a section in each window. For example, the core can comprise a plurality of conductive metallic laminations in each window, and the laminations in each window are or can be affixed (e.g., welded) to each other. Each window of the at least one cage is flanked by the sides of the two neighboring bars, and the laminations in each window include two outer laminations (such outer laminations can constitute the only laminations in the respective window) which are adjacent the sides of the two neighboring bars. At least one of the outer laminations has two end portions which are bent over the adjacent bar of the at least one cage to thus locate the laminations in the respective windows. Each end portion of an outer lamination in one of the windows can be spaced apart from an end portion of an outer lamination in a neighboring window. However, it is equally within the purview of the invention to construct the at least one cage in such a way that each end portion of an outer lamination in one of the windows is closely adjacent to or actually abuts an end portion of an outer lamination in a neighboring window.

In accordance with a modification, the core can comprise a substantially zig-zag shaped strip of conductive metallic sheet material in each window of the at least one cage. Each strip has a first end portion extending from the respective window and overlying one of the neighboring bars, and a second end portion extending from the respective window and overlying the other neighboring bar. One end portion of each strip is disposed at one side of the at least one core, and the other end portion of each strip is disposed at the other side of the at least one core. Each end portion of a strip in one of the windows can be spaced apart from an end portion of a strip in a neighboring window. It is also possible to construct the at least one cage in such a way that each end portion of a strip in one of the windows is adjacent to or abuts an end portion of a strip in a neighboring window.

The core of the improved secondary can comprise a stack of superimposed laminations and means for fastening the laminations to each other. To this end, the laminations have aligned openings, and the fastening means then includes a portion extending through the openings. For example, the fastening means can include a bolt or a screw having an externally threaded shank extending through the aligned openings, and an internally threaded support for the secondary; such support mates with the shank of the bolt or screw. If the core has a first side provided with the at least one set of recesses and a second side which is provided with a second set of recesses, the openings can be disposed between the two sets of recesses. Each lamination can be provided with a plurality of openings, and each opening of any one of these laminations is aligned with an opening of each other lamination. Such openings can form a row between the two sets of recesses, and the fastening means can include a bolt or screw for each opening of a lamination. It is also possible to provide each group of aligned openings between two bars of the at least one cage when the latter is assembled with the core.

As mentioned above, the secondary can further comprise a support for the at least one cage, and such secondary further comprises means for securing one rail of the at least one cage to the support. The securing means can comprise one or more discrete brackets (e.g., substantially L-shaped brackets) which are bolted, riveted, screwed or otherwise secured or affixed to the one rail and to the support. A portion of the one rail can be affixed to the support and the bracket or brackets can be omitted. If the support is disposed beneath the at least one cage, the aforementioned portion of the one rail can include a downwardly extending section which is of one piece with the remaining portion of the one rail (i.e., with the bars), and a substantially horizontal second section which is of one piece with the first section and is secured (e.g., bolted, welded or riveted) to the support. The connection between the support and the one rail can resemble a substantially T-shaped member having a first section which is of one piece with the bars of the at least one cage, and a second section which is of one piece with the first section and is secured to the support.

Still further, the means for securing the one rail to the support can comprise a first portion which is carried by the one rail and has at least one hole, and a second portion including a fastener extending through the at least one hole and engaging the support.

If the induction motor which embodies the improved secondary is a rotary motor, the core can comprise or constitute a cylinder having a peripheral surface which is provided with the at least one set of recesses. The rails then include or constitute rings which extend circumferentially of the cylinder and the bars extend from the peripheral surface into the respective recesses of the cylinder. The recesses extend or can extend substantially radially of the cylinder so that they have radially outer portions disposed at the peripheral surface of the cylinder at a first distance from each other (as measured in the circumferential direction of the cylinder) and radially inner portions which are nearer to the axis of the cylinder than the radially outer portions and are disposed at a smaller second distance from each other. The rails can be provided with radially offset portions (e.g., with radially inwardly offset portions having a triangular outline) between the bars. Such at least one cage can constitute a deformed originally straight (e.g., elongated ladder-shaped) blank with equidistant bars having a mutual spacing which matches or exceeds the mutual spacing of the recesses at the peripheral surface of the cylinder prior to deformation of the blank. The radially deformed portions of the rails between the recesses in the peripheral surface of the cylinder prior to deformation of the blank.

At least one end portion of each ring (deformed rail) can be affixed to the cage and/or to the other end portion of the same ring. For example, one end portion of each ring can be bonded (welded, soldered or adhesively secured) to the core and/or to the other end portion of the respective ring. It is also possible to connect one end portion of each ring to the core and/or to the other end portion of the same ring by mechanical means, e.g., by one or more rivets, screws, nuts and bolts or the like.

A further feature of the invention resides in the provision of a cage for use in a secondary of a linear or rotary induction motor or the like. The improved cage comprises at least one pair of spaced apart elongated rails and a plurality of bars which extend between and are of one piece with the rails. The cage can comprise at least one second pair of spaced apart elongated rails and a plurality of additional bars extending between and being of one piece with the rails of the second pair. The additional bars overlie the bars between the rails of the at least one pair, and each rail of the at least one pair overlies a rail of the at least one second pair. The rails of the at least one pair and the respective bars can be said to constitute a first part of such composite cage, and the rails of the at least one second pair and the additional bars, can be said to constitute a second part or unit of such composite cage. One of these parts can consist of a first material, and the other of these parts can consist of a different second material. Alternatively or in addition to such selection of the materials, the first part can have a first thickness and the second part can have a different second thickness.

At least one rail of the cage can be provided with one or more heat dissipating portions, e.g., with one or more ribs or otherwise configurated projections.

The bars can be at least substantially normal to the respective rails or each bar can make an oblique angle with each of the respective rails.

The novel features which are considered as characteristic of the invention are set forth in particular in the appended claims. The improved secondary itself, however, both as to its construction and the mode of making and assembling the same, together with additional features and advantages thereof, will be best understood upon perusal of the following detailed description of certain presently preferred specific embodiments with reference to the accompanying drawings.

BRIEF DESCRIPTION OF THE DRAWINGS

FIG. 1 is a side elevational view of the secondary of FIG. 6 and illustrates one mode of securing the laminations of the core to each other;

DESCRIPTION OF THE PREFERRED EMBODIMENTS

Figure 1:
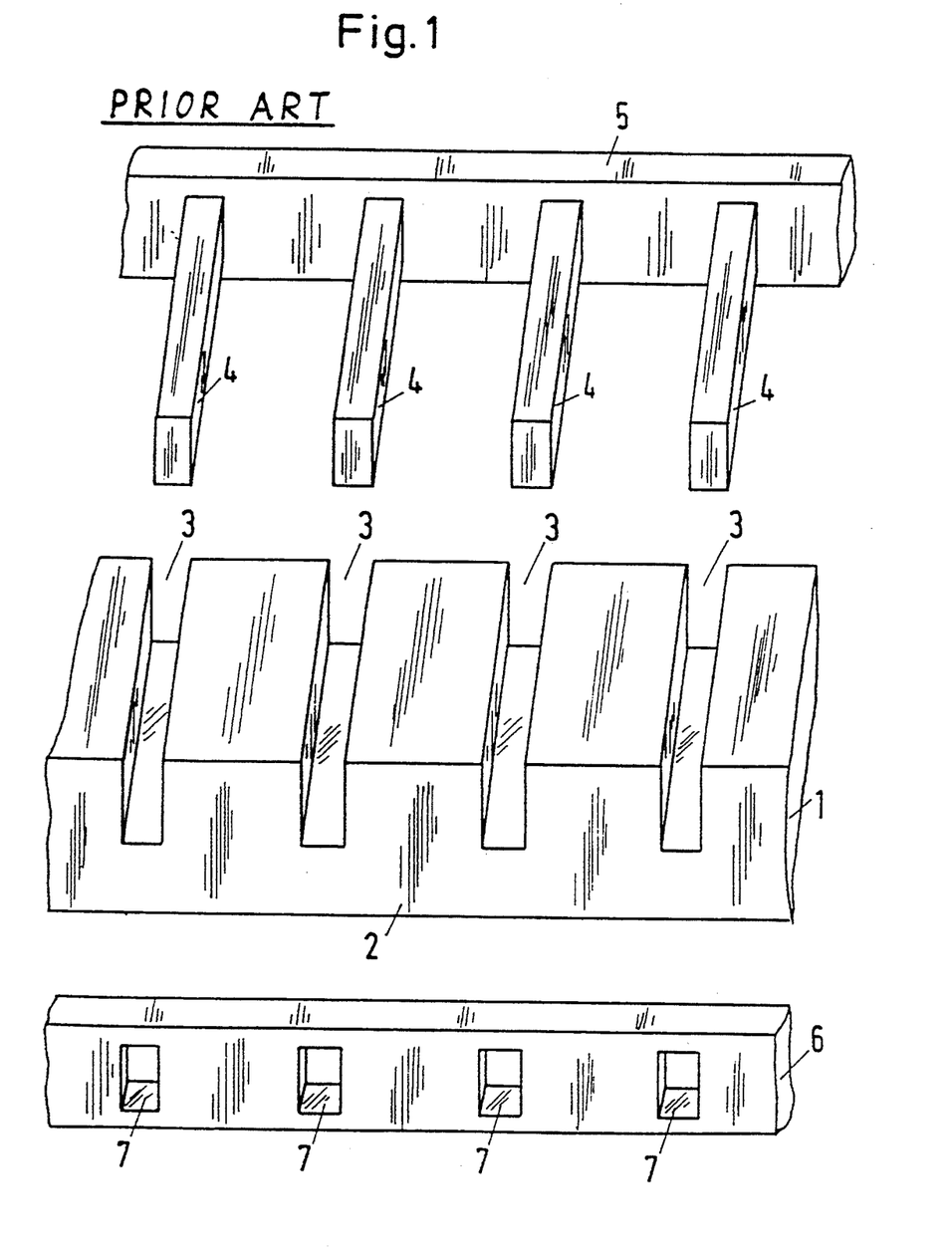
FIG. 1 is an exploded fragmentary perspective view of a conventional secondary for use in a linear induction motor.

FIG. 1 shows the secondary of a conventional linear induction motor. The secondary comprises a core 1 composed of a package of laminations 2 having cutouts which together define a set of recesses in the form of grooves 3 serving to receive the bars 4 of a cage. The latter further comprises two elongated carriers 5 and 6 (hereinafter called rails for short). The bars 4 are insertable into the core 1 through the open sides of the recesses 3. Insertion through the ends of the recesses 3 is not possible because, at least in most instances, the open ends of the recesses are narrowed by inwardly extending projections. The bars 4 can be connected with the rails 5 and 6 subsequent to introduction into the respective recesses 3. As shown in FIG. 1, it is also possible to connect one end portion of each bar 4 to the rail 5 before the bars are inserted into the recesses 3, and to thereupon connect the other end portion of each bar 4 with the rail 6. The rail 6 is provided with through holes 7 for reception of the respective end portions of the bars 4. The connections between the bars 4 and the rail 5 can be established by soldering, and the resulting comb-like structure is then assembled with the core 1 by introducing each bar 4 into the corresponding recess 3. The rail 6 is then slipped onto the projecting end portions of the bars 4 and each bar is soldered to the rail 6.

A drawback of the just described method of assembling a secondary is that the cost of the assembled secondary is very high. The high cost of the secondary is attributable to a number of factors. Thus, the rails 5, 6 and the bars 4 must be produced as separate parts, and the bars 4 must be soldered, welded or otherwise connected to the rail 5 in a series of first operations. In the next step, the bars 4 must be soldered, welded or otherwise connected to the rail 6 in a number of additional operations. Furthermore, the cost of making the conventional secondary is even higher if the bars 4 are to be connected to the rail 5 subsequent to insertion into the recesses 3 because each of a substantial number of bars 4 must be individually inserted into the corresponding recess 3 of the core 1.

Figure 2:
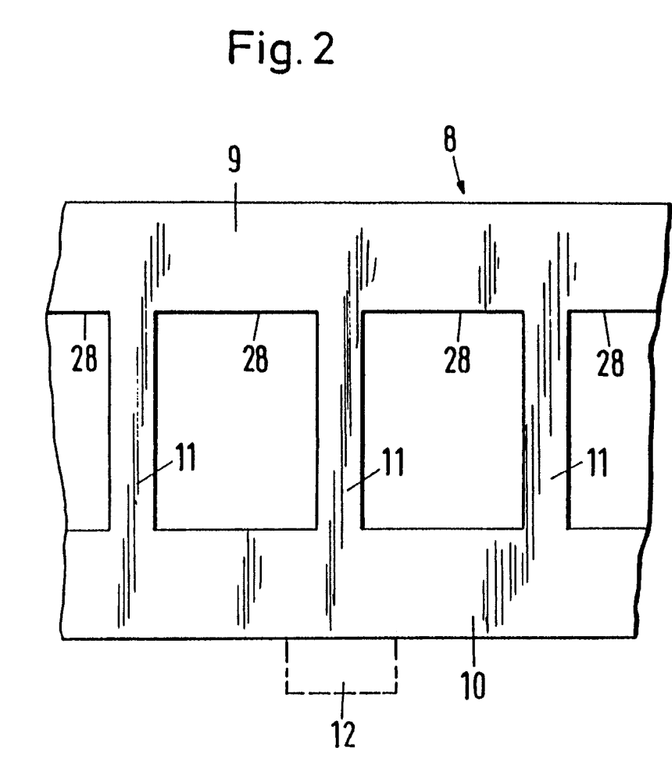
FIG. 2 is a fragmentary elevational view of the cage of a secondary which can be utilized in a linear induction motor and embodies one form of the present invention.

FIG. 2 shows a portion of a substantially ladder-shaped squirrel cage 8 for use in the secondary of a linear induction motor. The cage 8 comprises two spaced apart parallel rails 9 and 10 which are of one piece with the respective ends of a plurality of elongated parallel bars 11. The bars 11 alternate with windows 28. This cage is obtained by stamping from a sheet-like blank (not shown) in a single operation which results in the making of the bars 11 and rails 9, 10 in such a way that the end portions of the bars are of one piece with the respective rails. Thus, the cost of making the cage 8 is a fraction of the cost of making a cage in a manner as described with reference to FIG. 1. The windows 28 serve to receive sections of a core, e.g., sections 13 of a core 15 of the type shown in FIGS. 4 and 5. The blank which is used in a stamping machine for the making of one or more cages 8 can consist of a sheet of copper or aluminum. As will be described with reference to FIGS. 5, 9 and 10, a secondary can comprise two or more cages 8 each of which can but need not be made of the same material and each of which may but need not have the same thickness. For example, if a composite cage is assembled of two superimposed (overlapping or aligned) cages 8, one of these cages can be made of aluminum sheet stock and the other cage 8 can be made of copper sheet stock. The thickness of one of these cages can be a little more than or several times the thickness of the other cage.

Figure 3:
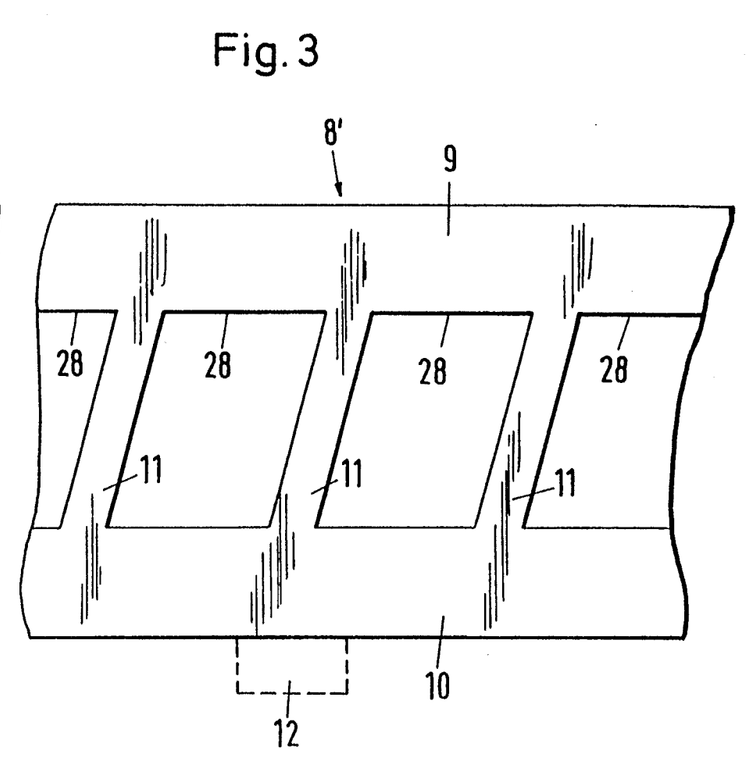
FIG. 3 is a similar fragmentary elevational view of a modified cage.

FIG. 2 shows that the bars 11 are normal to the rails 9, 10 and are equidistant from each other. FIG. 3 shows that each bar 11 of a modified cage 8' can make an oblique angle with each of the two rails 9 and 10.

Each of FIGS. 2 and 3 shows (by broken lines) a heat dissipating protuberance 12 on the rail 10. The rail 10 and/or the rail 9 can be provided with two or more protuberances 12 or with otherwise configured and-/or dimensioned protuberances in order to enlarge the exposed surface of the respective rail and to thus ensure more satisfactory dissipation of heat.

Figure 4:
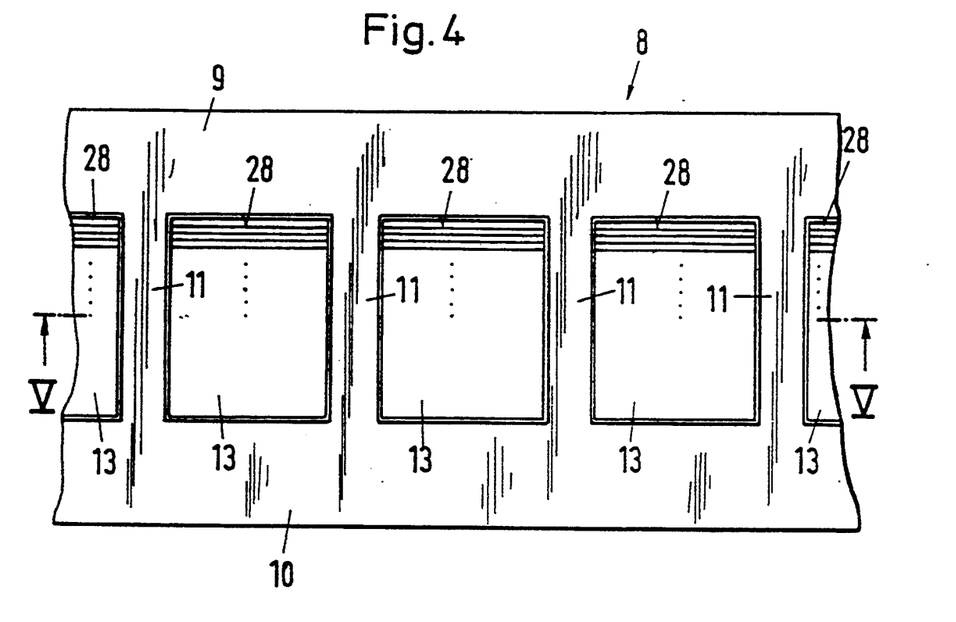
FIG. 4 is a fragmentary plan view of a secondary which employs a so-called one-sided or single-comb core and three cages of the type shown in FIG. 2.
Figure 5:
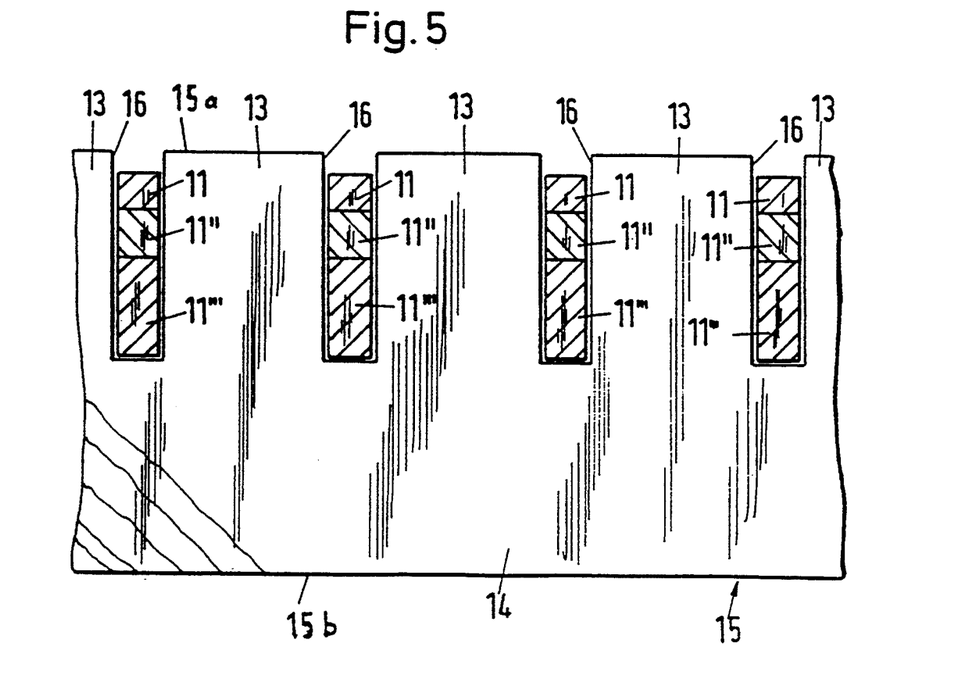
FIG. 5 is a sectional view substantially as seen in the direction of arrows from the line V—V of FIG. 4.

FIGS. 4 and 5 show a first secondary which can be used in a linear induction motor and comprises three cages 8 of the type shown in FIG. 2, i.e., with bars 11, 11″, 11‴ extending at right angles to the respective rails 9 and 10. The three cages are superimposed upon each other, with the bars 11‴ of the third or innermost cage received in the bottom portions of the respective recesses 16, with the bars 11 of the first or outermost cage received in the outermost portions of the respective recesses 16, and with the bars 11″ of the second or intermediate cage received between the bars 11 and 11‴ in the respective recesses 16. The thickness of each bar 11″ exceeds the thickness of a bar 11, and the thickness of each bar 11‴ is approximately twice the thickness of a bar 11″. These thicknesses were selected only by way of example. Furthermore, the composite cage can be assembled of only two cages 8 or of four or more discrete cages. Each recess 16 is an elongated groove having an open side and being flanked by two sections 13 of the core 15. The latter is assembled of a package or stack of laminations 14 (disposed in planes parallel to the plane of FIG. 5) having cutouts which are aligned with the cutouts of the other laminations to form the recesses 16 when the laminations are assembled into a package constituting the core 15. The latter resembles a comb having a back which is devoid of recesses and a series of teeth constituted by sections 13 and being separated from each other by discrete recesses or grooves 16. The laminations of the package or stack 14 can be made of iron. The core 15 is a so-called one-sided core or single-comb core because only one (15a) of its two opposing sides 15a, 15b has a set of recesses.

An advantage of a composite cage of the type shown in FIG. 5 is that the maker of the secondary can select the desired current. As mentioned above, the cage 8 including the bars 11 can be made of a first material, the cage including the bars 11″ can be made of a second material, and the cage including the bars 11‴ can be made of the first material, of the second material or of a third material. For example, one of the cages can be made of copper, another of the cages can be made of aluminum, and the third cage can be made of a suitable alloy. It is preferred to make the outermost cage 8 (the one with the bars 11) of a magnetizable material. The three individual cages (with bars 11, 11″ and 11‴) can be electrically insulated from each other.

Figure 6:
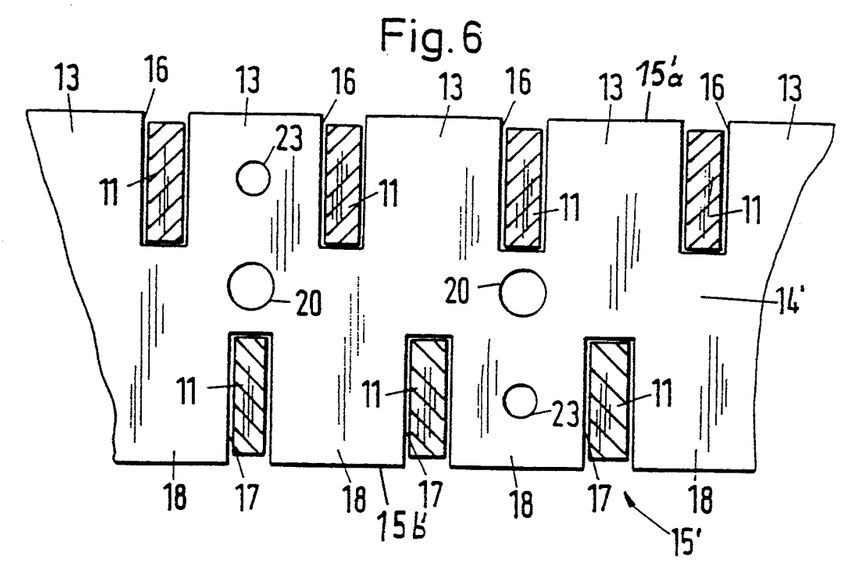
FIG. 6 is a fragmentary plan view of the secondary which employs a so-called twin-comb core and two discrete cages having bars extending into recesses provided in the respective sides of the core.

FIG. 6 shows a portion of a so-called two-sided or twin-comb core 15′. The side 15a′ is provided with a first set of equidistant recesses 16 in the form of open-sided grooves, and the side 15b′ (located opposite the side 15a′) is provided with a second set of equidistant recesses 17 in the form of open-sided grooves. The recesses 16 of the first set are staggered with respect to the recesses 17 of the second set. For example, each recess 17 can be disposed in a plane substantially midway between the planes of the two neighboring recesses 16. The neighboring recesses 16 are separated from each other by sections 13, and the recesses 17 are separated from each other by sections 18 of the core 15′. The latter can be assembled of a package or stack of laminations 14′ having aligned cutouts which together constitute the recesses 16 in the side 15a′ and recesses 17 in the side 15b′ of the core 15′. FIG. 6 shows a single cage with bars 11 in the recesses 16, and a single cage with bars 11 in the recesses 17 of the core 15′. However, each of the two sets of recesses 16, 17 can receive a composite cage (e.g., a cage of the type shown in FIG. 5), or one of these sets of recesses can receive a one-piece cage (with a single series of bars 11, 11″ or 11‴) and the other set of recesses can receive a composite cage with two or more overlapping discrete cages (e.g., cages of the type shown in FIG. 2 or 3).

The recesses 17 need not be staggered relative to the recesses 16, or the staggering need not correspond to that shown in FIG. 6 (with each recess 17 disposed substantially midway between the two neighboring recesses 16).

Figure 7:
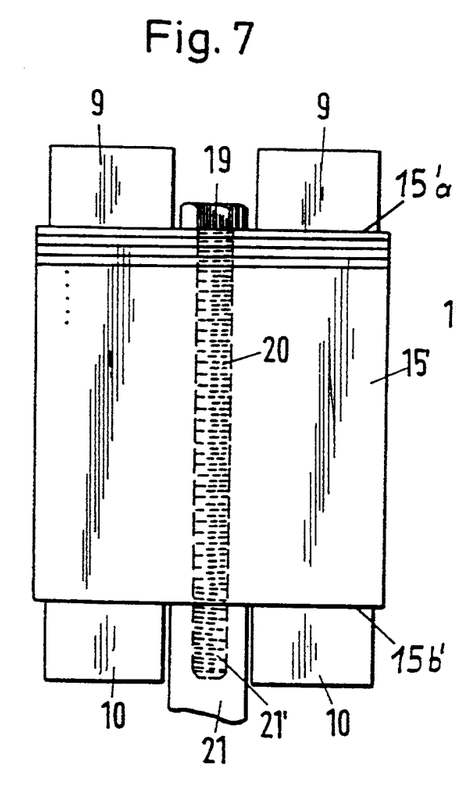

FIG. 7 illustrates one mode of assembling the stack 14′ of laminations into a core 15′ of the type shown in FIG. 6. In addition to the cutouts which together form the recesses 16 and 17, the laminations of the package 14′ are provided with a row of openings or holes 20 which are disposed between the two sets of recesses 16, 17 (see FIG. 6) and each of which can receive the externally threaded shank of a bolt 19 having a head abutting the side 15a′ of the core 15′. The free end of the shank extends beyond the side 15b′ and is received in the tapped bore or hole 21′ of an internally threaded support 21 for the secondary including the core 15 and the cages including the bars 11 in the recesses 16 and 17. The support 21 can be affixed to or can form part of a plate-like base (see the base 35 in FIG. 17). The bolts 19 may but need not be equidistant from each other, and the holes or openings 20 may but need not be disposed exactly midway between the two sets of recesses 16 and 17.

Figure 8:
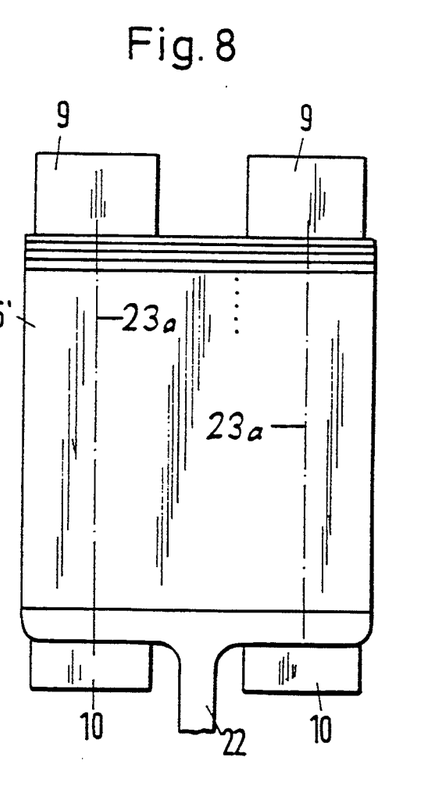
FIG. 8 is a similar side elevational view but showing another mode of securing the laminations of the core to each other.

FIG. 8 shows the core 15′ and a different (I-shaped or T-shaped or H-shaped) support 22 which is secured to the core by a number of bolts 23a or analogous fasteners (indicated by phantom lines) extending through openings or holes 23 (FIG. 6) which are provided in the sections 13 and 18 between the recesses 16 and 17, respectively. The bolts 23a can be replaced with rivets or with other types of fasteners. If the fasteners 23a are bolts with externally threaded shanks, the support 22 has tapped bores or holes for the free ends of such shanks.

Each of FIGS. 1 and 8 shows two cages which are but need not be identical and each of which comprises two rails 9, 10 and a series of preferably parallel bars 11, 11″ or 11‴ (not shown) between the rails.

Figure 9:
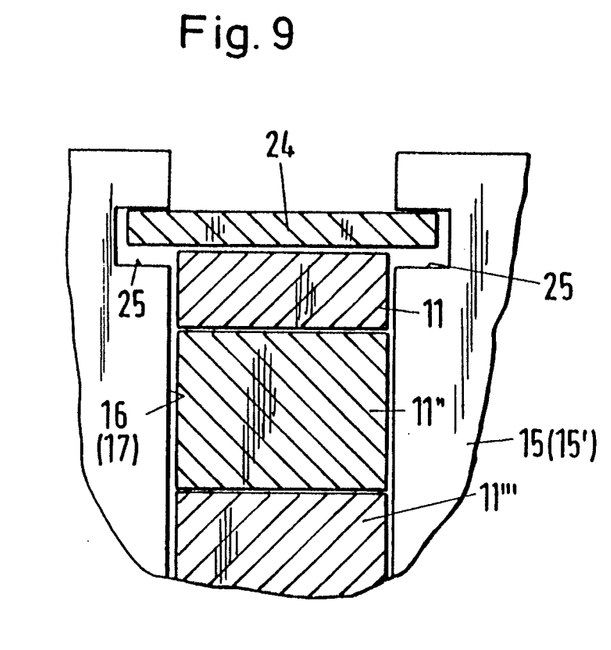
FIG. 9 is a fragmentary sectional view of a secondary constituting a modification of the secondary which is shown in FIG. 5.

FIG. 9 is an enlarged view of a detail of a secondary constituting a modification of the secondary which is shown in FIG. 5. The difference is that each of the recesses 16 (and/or 17) is provided with two confronting lateral extensions 25 which are adjacent the open side of the respective recess. The bars 11, 11′, 11‴ of the three discrete cages are received in the respective recesses 16 between the bottom ends of such recesses and the respective pairs of extensions 25. These extensions receive the marginal portions of discrete closures 24 in the form of elongated strips which can be slid into the respective extensions from one end of the core 15 or 15′ to serve as a means for confining the bars 11, 11″ and 11‴ in their recesses. Each closure 24 can be made of a magnetizable, non-magnetizable or partly magnetizable material, and each such closure can constitute an elongated strip-shaped portion of a plate which is subdivided to yield a plurality of identical or different closures. An inserted closure 24 can urge the adjacent bar 11 toward the adjacent bars 11″ and 11‴.

Figure 10:
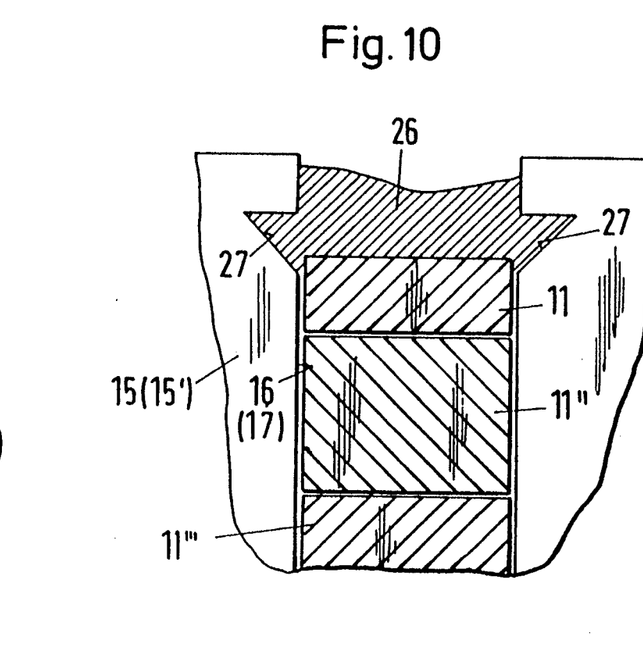
FIG. 10 illustrates a portion of a secondary which constitutes a modification of the secondary of FIG 9.

FIG. 10 shows portion of a closure 26 which consists of a hardenable substance such as an adhesive, a synthetic resin or an impregnating agent in admixture with particles of magnetizable material. The hardenable substance is poured through the open side of the recess 16 or 17 in such quantities that it at least partially fills the confronting lateral extensions 27 of the recess. When the substance hardens, it forms a closure or plug which confines and anchors the respective bars 11, 11″ and 11‴ in the respective recess 16 or 17. The provision of lateral extensions 27 is optional, i.e., the bond between the surfaces surrounding the recess 16 or 17 and the hardened substance 26 can suffice to ensure reliable confinement of the bars 11, 11″ and 11‴.

Figure 11:
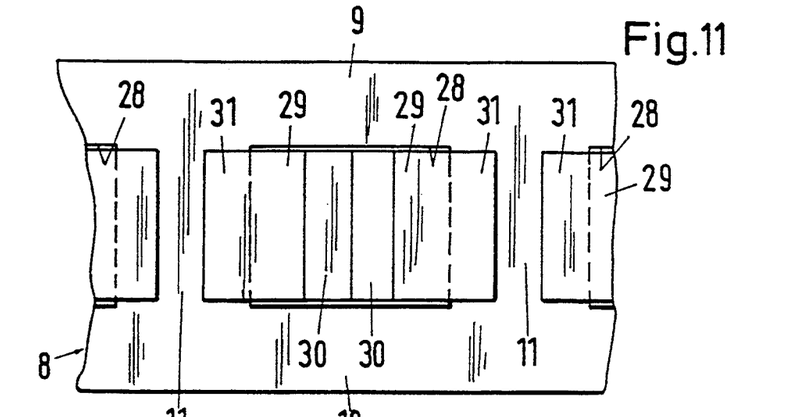
FIG. 11 is a fragmentary elevational view of a secondary employing a cage of the type shown in FIG. 2 and a modified core composed of packages of discrete laminations for each window of the core.
Figure 12:
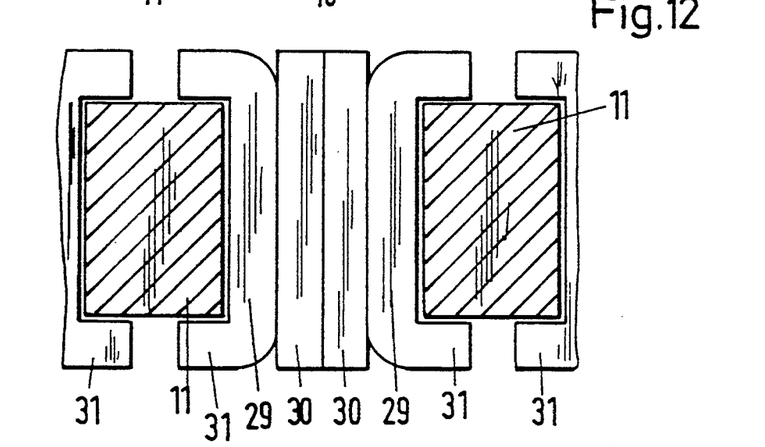
FIG. 12 is a sectional views of the secondary which is shown in FIG. 11.
Figure 13:
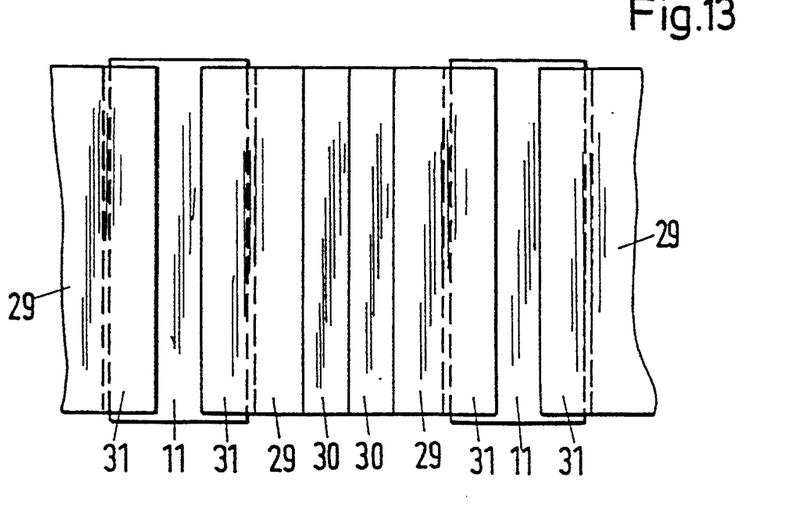
FIG. 13 is a plan view of the structure which is shown in FIG. 12.

FIGS. 11 to 13 illustrate a portion of a secondary for use in a so-called twin-chamber linear induction motor.

The windows 28 of the cage 8 which is shown in FIGS. 11 to 13 each receive the median sections of four laminations including two outer laminations 29 and two inner or central laminations 30 between the outer laminations. The number of laminations in each of the windows 28 can be reduced to two but is preferably three or more. The outer laminations 29 have bent over end portions 31 which extend beyond the respective windows 28 and overlie the exposed end faces of the adjacent bars 11. The median laminations 30 may but need not extend beyond the respective windows 28, and each such lamination can constitute a rectangular plate. Basically, the laminations 30 serve as fillers to cooperate with the median sections of the outer laminations 29 in order to fill or nearly fill the respective windows 28. The neighboring laminations 29, 30 in each of the windows 28 can be soldered, welded, riveted or otherwise connected to each other, e.g., by resorting to the so-called stamping-packaging technique. Once the making of a package of, for example, four laminations 29, 30 is completed, the thus obtained package is pushed into the selected window 28 from the one or the other side of the cage 8 including the bars 11 and the rails 9, 10, and the end portions 31 of the outer laminations 29 are thereupon bent to confine each package in the respective window. The arrangement is preferably such that one end portion 31 of each outer lamination 29 is bent in a manner as shown in FIG. 12 before the respective package of four laminations 29 and 30 is introduced into a selected window 28, and the other end portions 31 are bent upon completion of the inserting step. The initially bent end portions 31 then constitute abutments or stops which determine the extent of penetration of a package of four laminations 29, 30 into the respective window 28.

FIGS. 11 to 13 show that the bent over end portions 31 of the outer laminations 29 of packages in neighboring windows 28 are spaced apart from each other. Such spacing can be reduced to small clearances or the end portions 31 of outer laminations 29 in neighboring windows 28 can actually contact each other.

Figure 14:
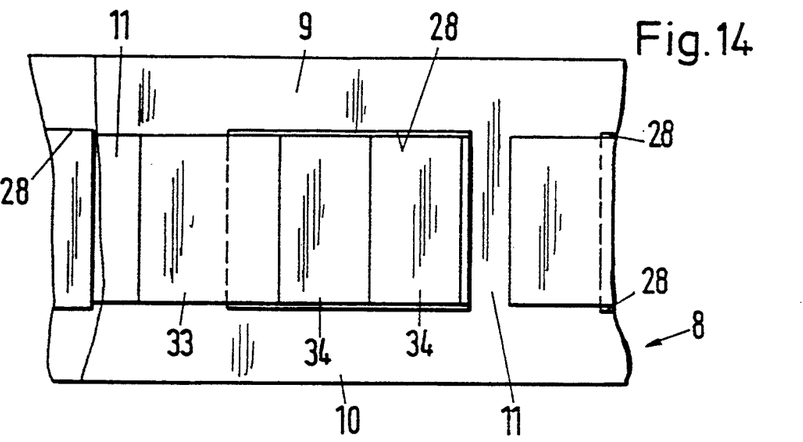
FIG. 14 is a fragmentary elevational view of a secondary which constitutes a modification of the secondary of FIGS, 11 to 13.
Figure 15:
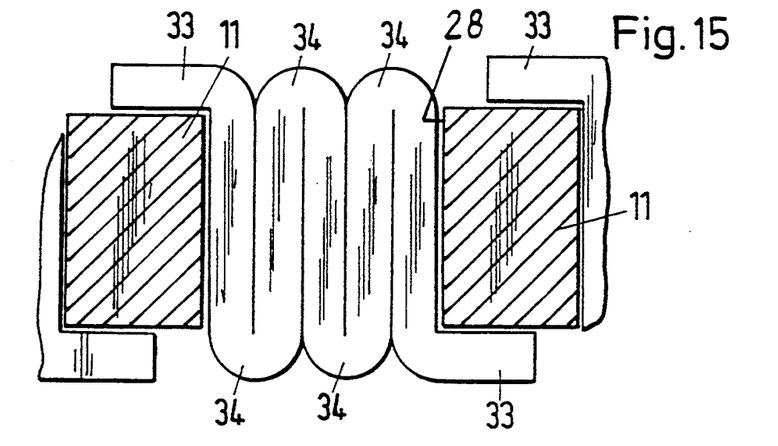
FIG. 15 is a sectional view of the secondary of FIG. 14.
Figure 16:
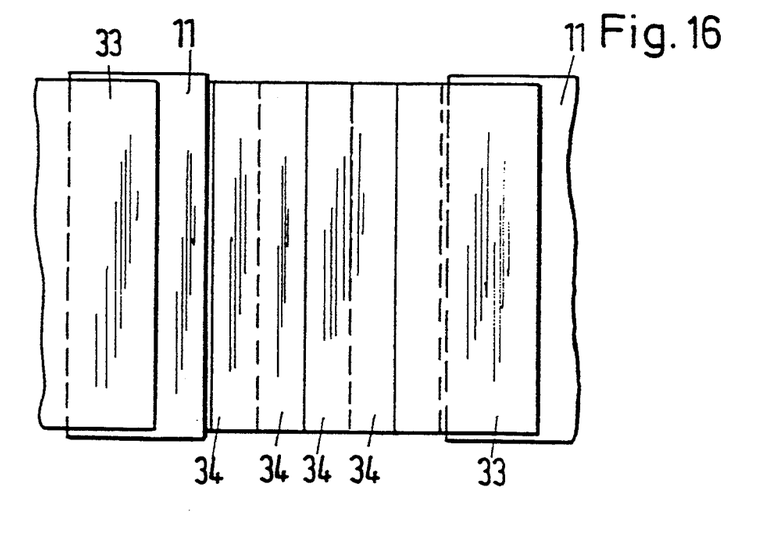
FIG. 16 is a plan view of the structure which is shown in FIG. 15.

Referring to FIGS. 14 to 16, there is shown a secondary which comprises a cage 8 with two rails 9, 10 and bars 11 which are separated from each other by windows 28, and a modified core having a zig-zag shaped lamination 34 in each window 28. The neighboring panels or sections of each lamination 34 actually abut each other, and the end portions 33 of each lamination overlie the exposed sides of the respective adjacent or neighboring bars 11. Each lamination 34 replaces an entire package of laminations (29, 30) of the type shown in FIGS. 11 to 13. The laminations 34 can be made of sheet iron. Bending of one of the end portions 33 can take place prior to insertion of a zig-zag shaped lamination 34 into a selected window 28, and the other end portion 33 is bent thereafter to ensure reliable confinement of the lamination in the window. The thickness of a lamination 34 can exceed or can be less than the thickness of the illustrated laminations 34; the number of panels or sections of a lamination 34 will depend upon the thickness of the sheet stock and on the width of the windows 28.

The length of the end portions 33 can be selected in such a way that each of these end portions is spaced apart from the nearest panel or section of the lamination 34 in the adjacent window 28 (this is actually shown in FIGS. 14 to 16). Alternatively, the length of each end portion 33 can be selected with a view to ensure that each of these end portions is closely adjacent to or actually contacts the nearest section of the lamination 34 in the neighboring window 28. The neighboring sections of each lamination 34 preferably fill or at least substantially fill the respective window 28.

Figures 17, 18:
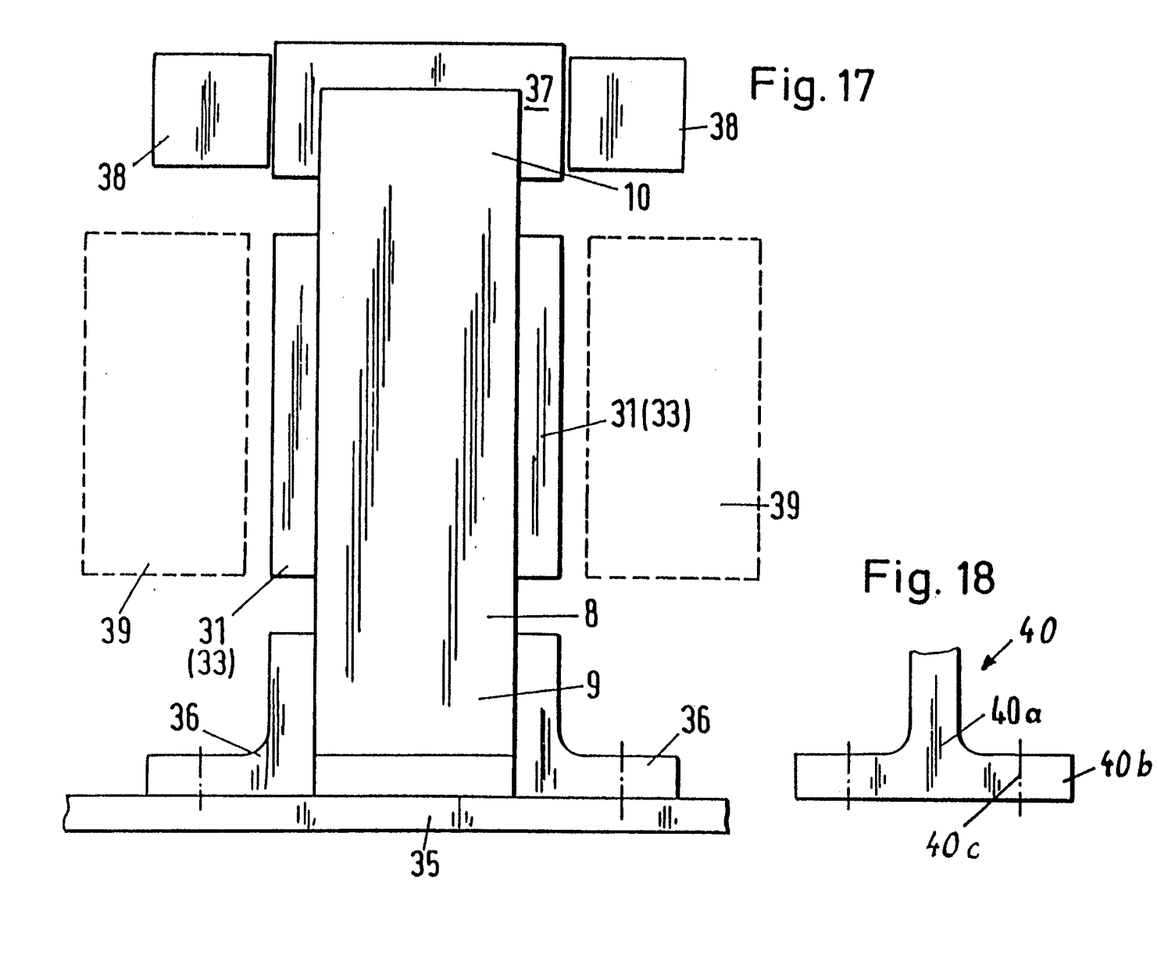
FIG. 17 is a schematic end elevational view of a twin-comb linear induction motor having a secondary of the type shown in FIGS. 11 to 13 or in FIGS. 14 to 16.
FIG. 18 illustrates a portion of a modified support for the cage of the improved secondary.

FIG. 17 shows a twin-comb linear induction motor having a primary 39 (indicated by broken lines) and a secondary of the type shown in FIGS. 11 to 13 or 14 to 16. The support for the secondary includes a plate-like base 35 and two L-shaped brackets 36 which are bolted, riveted, screwed or otherwise secured to the base 35 and are also bolted, riveted or otherwise suitably affixed to the adjacent rail or rails 9. The cage 8 which is shown in FIG. 17 is disposed in a plane extending at right angles to the plane of FIG. 17. The rail 10 of the cage 8 is partially surrounded by u an U-shaped holder 37. The base of the holder 37 overlies the rail 10 and the downwardly extending legs of this holder carry idler rollers or guide rollers 38 which are rotatable about vertical axes. The rollers 38 serve to guide the secondary including the cage 8 and the laminations 29, 30 or 34 of the core in directions at right angles to the plane of FIG. 17.

The brackets 36 of the support which is shown in FIG. 17 can be omitted if the support is constructed in a manner as shown in FIG. 18. The illustrated support 40 has a downwardly extending portion or section 40a which is of one piece with the cage 8 (not shown in FIG. 18), e.g., with the rail 9 or 10 of such cage, and a second section or portion 40b which is of one piece with the section 40a and can be riveted, bolted or otherwise affixed (at 40c) to the base 35 (not shown in FIG. 18).

Figure 19:
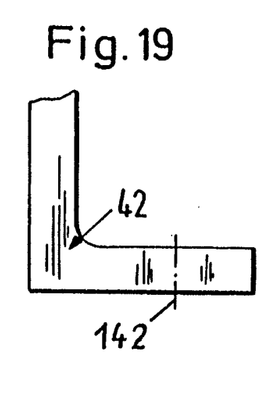
FIG. 19 illustrates a portion of a further support.

FIG. 19 shows a portion of a substantially L-shaped support 42 having an upright portion or section of one piece with a cage (not shown) and a substantially horizontal second portion or section which is provided with holes (not shown) for fasteners 142 serving to secure the part 42 to a base 35 (not shown) or the like.

Figure 20:
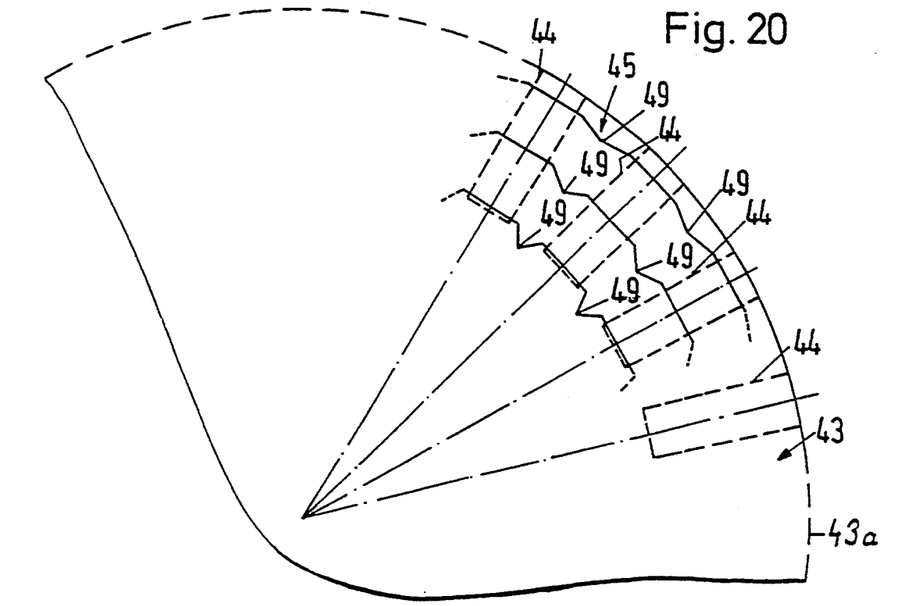
FIG. 20 is a fragmentary plan view of a secondary for use in a rotary induction motor.
Figure 21:
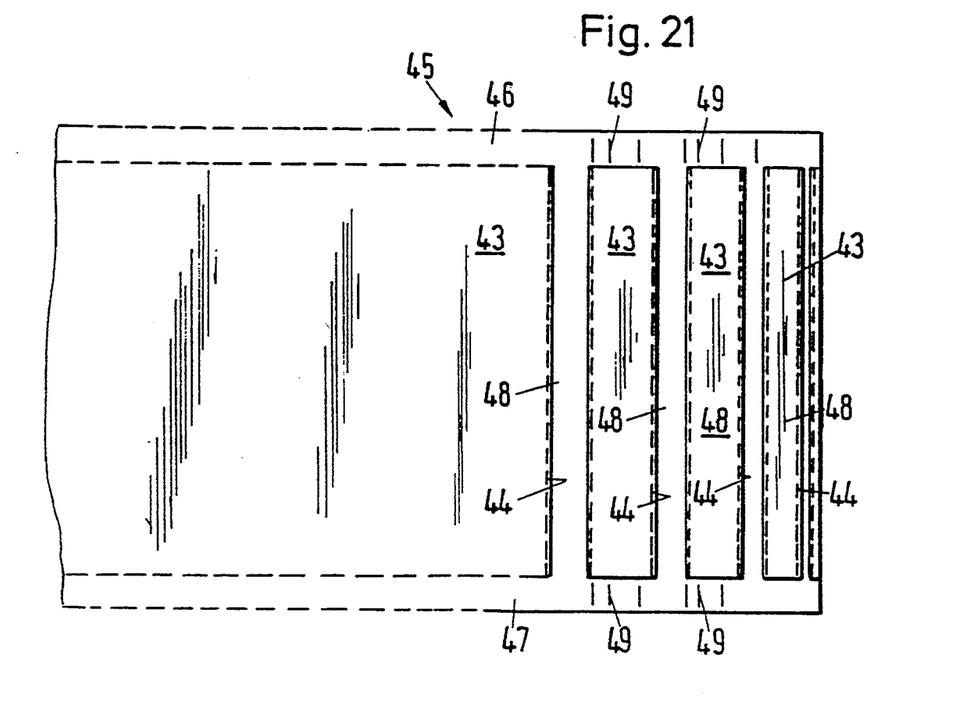
FIG. 21 is a fragmentary elevational view of the secondary which is shown in FIG. 20.

Referring to FIGS. 20 and 21, there is shown the secondary of a cylindrical (rotary) induction motor. The core 43 of the secondary of FIGS. 20 and 21 is a cylinder having a peripheral surface 43a provided with equidistant axially parallel recesses 44 extending substantially radially of the cylinder. Thus, the radially outer portions of the recesses 44 are more distant from each other than the radially inner portions, i.e., those portions which are nearer to the axis of the cylindrical core 43. The latter can be assembled of a package of circular disc-shaped laminations having cutouts which together form the recesses 43a.

The cage 45 of the secondary of FIGS. 20 and 21 comprises at least two ring-shaped originally straight rails 46, 47 which are spaced apart from each other and are of one piece with the respective end portions of equidistant bars 48. Each of the originally straight rails 46, 47 and the bars 48 between them can constitute a stamping which is applied around the cylindrical core 43 and whose rails are converted into rings and are otherwise deformed in order to permit proper insertion of each bar 48 into a discrete recess 44. In order to compensate for increasing distance between the neighboring recesses 44 (as seen from the axis toward the peripheral surface 43a of the core 43), the rails 46, 47 are provided with deformed radially inwardly offset portions 49 which alternate with the bars 48 in the circumferential direction of the cylindrical core 43. If the cage of the secondary which is shown in FIGS. 20 and 21 includes several discrete cages each having two ring-shaped rails 46, 47 and a set of bars 48 between such rails, the angles between the halves of the deformed portions or offset portions 49 increase in a direction radially inwardly toward the axis of the cylindrical core 45. This can be seen in the right-hand portion of FIG. 20. Care should be taken to ensure that the mutual spacing of bars 48 to be received in the radially outer portions of the recesses 44 should suffice to permit convenient introduction of such bars into the recesses.

The end portions of each of the ring-shaped (originally straight) rails 46 and 41 are welded, soldered, riveted, screwed or otherwise reliably secured to the package of laminations which constitutes the cylindrical core 43 and/or to each other.

An important advantage of the improved method and induction motor is that the secondary can be produced and assembled at a greatly reduced cost. Thus, it is no longer necessary to produce the bars of a cage independently of the rails and/or vice versa. This entails considerable savings in time, material and equipment. For example, it is no longer necessary to solder, weld or otherwise connect the end portions of the bars to the rails, and the making of a cage can be completed before the cage is assembled with a core. Elimination of welding, soldering and like operations contributes significantly to lower cost of the improved cages and of the assembled secondaries including such cages. A simple stamping operation suffice s to produce a finished cage 8 or 8' which can be assembled with a core (such as 15 or 15'), either alone or in combination with one or more additional cages.

Another important advantage of the improved method and secondary is that desired magnetic characteristics can be achieved by the simple expedient of properly assembling two or more one-piece cages which may but need not consist of the same material and which may but need not have identical thicknesses.

The protuberances 12 can serve the aforediscussed purpose of promoting the dissipation of heat. Additionally, such protuberances can be used for balancing of the cages and of the assembled secondaries.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of making a secondary for use in an induction motor comprising the steps of:
   (a) providing a core with at least one set of recesses;
   (b) forming at least two substantially ladder-shaped cages, each said cage having two spaced apart rails and bars extending between, and of one piece with, the rails; and
   (c) inserting the bars of each said cage into respective recesses of the core, so as to stack the bars in the recesses and at least partially fill the recesses with stacked bars.

2. The method of claim 1, wherein said forming step comprises stamping at least one said cage from a blank.

3. The method of claim 1, wherein said forming step includes making at least one said cage from a sheet-like blank of a material which is selected from the group consisting of copper and aluminum.

4. The method of claim 1, wherein said step of providing recesses includes providing the core with grooves each having an open side and said inserting step includes introducing the bars into the grooves so that the bars are spaced apart from the open sides of the grooves, and further comprising the step of anchoring the bars in the respective grooves, including admitting a hardenable substance into the grooves at the open sides thereof.

5. The method of claim 4, wherein said providing step further comprises providing each said groove with at least one lateral extension at the open side thereof, said anchoring step comprising admitting the hardenable substance in quantities such as to at least partially fill the extensions.

6. The method of claim 4, wherein the hardenable substance is an adhesive.

7. The method of claim 4, wherein the hardenable substance is a synthetic resin.

8. The method of claim 4, wherein said hardenable substance contains an impregnating agent and magnetizable ingredients in the impregnating agent.

9. The method of claim 1, wherein said step of providing recesses includes providing the core with grooves each having an open side and at least one lateral extension at the open side thereof, said inserting step comprising introducing the bars into the grooves so that the extensions of the grooves are located between the introduced bars and the respective open sides, and further comprising the step of confining the bars in the respective grooves including overlapping the introduced bars by closures having portions extending into the respective extensions.

10. The method of claim 1, wherein said providing step comprises assembling a stack of superimposed laminations having cutouts which together constitute the recesses of the core.

11. The method of claim 1, wherein said forming step includes forming the at least one cage with windows which alternate with the bars, said providing step comprising making the core of at least one lamination having sections which extend into the windows upon completion of said inserting step.

12. The method of claim 11, wherein said providing step comprises making the core from a plurality of superimposed laminations having aligned sections extending into the windows upon completion of the inserting step.

13. The method of claim 12, wherein portions of sections of at least one lamination project from the respective windows, and further comprising the step of bending the projecting portions of the sections of said at least one lamination to confine such sections in the respective windows.

14. The method of claim 13, wherein the at least one lamination abuts a bar of the at least one cage.

15. The method of claim 11, wherein said making step comprises providing a discrete strip-shaped lamination for each window of the at least one cage and folding each lamination into a package of neighboring layers having ends which extend from the respective window upon completion of said inserting step.

16. The method of claim 15, wherein each window is disposed between two neighboring bars, and further comprising the step of bending each end of each inserted package against one of the neighboring bars.

17. The method of claim 1, wherein said providing step comprises making a cylindrical core having a peripheral surface with the at least one set of recesses in the peripheral surface.

18. The method of claim 17, wherein said inserting step comprises introducing each bar into a discrete recess and deforming the rails between the bars.

19. The method of claim 18, wherein said inserting step further comprises flexing the rails at the peripheral surface into ring-shaped bodies.

20. The method of claim 1, wherein each of said recesses has an open side and said inserting step includes introducing the bars into the recesses so that the bars are spaced apart from the open sides of the recesses, and further comprising the step of anchoring the bars in the respective recesses, including admitting a hardenable substance into the recesses at the open sides thereof.

21. The method of claim 20, wherein said providing step further comprises providing each said recess with at least one lateral extension at the open side thereof, said anchoring step comprising admitting the hardenable substance in quantities so as to at least partially fill the extensions.

22. The method of claim 20, wherein the hardenable substance is an adhesive.

23. The method of claim 20, wherein the hardenable substance is a synthetic resin.

24. The method of claim 20, wherein said hardenable substance contains an impregnating agent and magnetizable ingredients in the impregnating agent.

25. The method of claim 1, wherein each of said recesses has an open side and at least one lateral extension at the open side thereof, said inserting step comprising introducing the bars into the recesses so that the at least one extension is located between the introduced bars and the respective open side, and further comprising the step of confining the bars in the respective recesses including overlapping the introduced bars by closures having portions extending into the respective extensions.

26. A method of making a secondary for use in an induction motor, comprising the steps of:
(a) providing a plurality of discrete cores;
(b) forming at least one substantially ladder-shaped cage, each said cage having two spaced apart rails and bars extending between, and of one piece with the rails, and windows which alternate with said bars; and
(c) inserting the cores into respective windows of the at least one cage, each said core being formed of at least one package of neighboring layers having sections which extend into said windows upon completion of said insertion step, each of said cores at least partially filling a respective window.

27. The method of claim 26, wherein said providing step comprises assembling a stack of superimposed laminations for each said core.

28. The method of claim 26, wherein said providing step comprises making each of said cores from a plurality of superimposed layers having aligned sections extending into the windows upon completion of the inserting step.

29. The method of claim 26, wherein said providing step comprises providing a discrete strip-shaped layer for each window of the at least one cage and folding each layer into a package of neighboring layers having ends which extend from the respective window upon completion of said inserting step.

30. A method of making a secondary for use in an induction motor, comprising the steps of:
(a) forming at least one substantially ladder shaped cage, each said cage having two spaced apart rails and bars extending between, and of one piece with the rails, and windows which alternate with said bars; and
(b) inserting discrete cores at least partially into respective windows of the cage, each of said cores being formed of at least one package of neighboring layers having sections which extend into said window upon completion of said insertion step, each of said cores at least partially filling a respective window.

31. The method of claim 30, wherein said forming step comprises stamping the at least one cage from a blank.

32. The method of claim 30, wherein said forming step includes making the at least one cage from a sheet-like blank of a material which is selected from the group consisting of copper and aluminum.

33. The method of claim 30, wherein portions of sections of at least one layer project from the respective windows, and further comprising the step of bending the projecting portions of the sections of said at least one layer to confine such sections in the respective windows.

34. The method of claim 33, wherein the at least one layer abuts a bar of the at least one cage.

35. The method of claim 30, wherein each window is disposed between two neighboring bars, and further comprising the step of bending each end of each inserted package against one of the neighboring bars.

* * * * *